United States Patent [19]
Honma

[11] Patent Number: 5,300,352
[45] Date of Patent: Apr. 5, 1994

[54] LAMINATE
[75] Inventor: Shiro Honma, Waki, Japan
[73] Assignee: Mitsui Petrochemical Industries, Ltd., Tokyo, Japan
[21] Appl. No.: 897,091
[22] Filed: Jun. 11, 1992
[30] Foreign Application Priority Data
  Jun. 14, 1991 [JP] Japan .................. 3-143299
[51] Int. Cl.$^5$ .................. B32B 15/08; B32B 27/36
[52] U.S. Cl. .................. 428/212; 428/516; 428/412; 428/483; 428/518; 428/519; 428/476.9
[58] Field of Search ............... 428/483, 516, 412, 518, 428/519, 212, 476.9

[56] References Cited
U.S. PATENT DOCUMENTS
  4,614,778  9/1986  Kajiura et al. .................. 526/281
  4,918,133  4/1990  Moriya et al. .................. 524/518

FOREIGN PATENT DOCUMENTS
  0083495  7/1983
  0203799  12/1986
  0306747  3/1989
  0427567  5/1991  European Pat. Off. .
  3232209  3/1984  Fed. Rep. of Germany .
  1398329  6/1975  United Kingdom .

Primary Examiner—P. C. Sluby
Attorney, Agent, or Firm—Sherman and Shalloway

[57] ABSTRACT

The laminate of the invention comprises a substrate and a resin surface layer having a glossiness of not less than 60% when measured at an incidence angle of 60° laminated on at least one side surface of the substrate, and the substrate is formed from at least one cycloolefin polymer (A) selected from the group consisting of a random copolymer (a-1) of specific cycloolefin and ethylene, a ring opening polymer (a-2) of specific cycloolefin, a ring opening copolymer (a-3) of specific cycloolefin and a hydrogenation product (a-4) of the ring opening polymer or the ring opening copolymer, or formed from a cycloolefin resin composition (B) comprising the cycloolefin polymer (A) and crystalline polyolefin and/or an α-olefin elastomeric copolymer. The substrate shows excellent resistance to flon gas, so that the resin surface layer is effectively prevented from occurrence of cracks caused by influence of flon gas.

9 Claims, 2 Drawing Sheets

LAMINATE

FIELD OF THE INVENTION

The present invention relates to a laminate sheet having a substrate comprising a specific cycloolefin.

BACKGROUND OF THE INVENTION

As resins for forming resin surface layers of electric appliances, decorative products and interior parts of automobiles, resins of high surface glossiness such as polystyrene, an acrylonitrile/butadiene/styrene copolymer (ABS resin), polycarbonate, polyalkylene terephthalate and polyvinyl chloride are widely employed.

Some of the resin surface layers are provided on an expanded resin material which is excellent in heat insulation and impact resistance. In the case of providing the resin layer of high surface glossiness on the expanded resin material, the resin surface layer of high surface glossiness is generally laminated on an expanded resin material obtained by expanding a resin using an expanding component such as a fluorine-containing solvent. However, resins used for forming the surface layer of high surface glossiness are not sufficient in resistance to the expanding component. Therefore, when a product having a surface layer made of such resins is used for a long period of time, various characteristics of the resin surface layer, particularly surface hardness, rigidity and surface glossiness, are apt to deteriorate For example, when the surface layer is kept under severe conditions such as a low temperature for a long period of time as in the case of linings of electrical appliances wherein heat insulation of high level is demanded, the characteristics of the surface layer deteriorate, resulting in not only the reduction of surface glossiness but also in the occurrence of cracks.

For solving such problems on the resin surface layer, an attempt to modify the resin used for forming the surface layer has been made, but the effect of this attempt is not necessarily satisfactory

OBJECT OF THE INVENTION

An object of the present invention is to provide a novel laminate capable of forming a surface layer of high glossiness on a surface of a molded product. More particularly, the object of the invention is to provide a laminate whose surface layer is hardly changed in its characteristics such as surface glossiness, rigidity and surface hardness, even when the laminate is used under severe conditions for a long period of time.

SUMMARY OF THE INVENTION

There is provided by the present invention a laminate comprising a substrate and a resin surface layer having a glossiness of not less than 60% when measured at an incidence angle of 60° which is laminated on at least one surface of the substrate, wherein the substrate comprises at least one cycloolefin polymer [A] selected from the group consisting of a random copolymer (a-1) of ethylene and cycloolefin represented by the following formula [I], a ring opening polymer (a-2) of cycloolefin represented by the following formula [I], a ring opening copolymer (a-3) of cycloolefins represented by the following formula [I], a hydrogenation product (a-4) of the ring opening polymer or the ring opening copolymer, an unsaturated carboxylic acid graft-modified product (a-5) of the above (a-1), (a-2), (a-3) or (a-4), and a cross-linked product (a-6) of the above (a-5), or the substrate comprises a cycloolefin resin composition [B] composed of the cycloolefin polymer [A] and crystalline polyolefin and/or an α-olefin elastomeric copolymer:

wherein n is 0 or 1; m is 0 or a positive integer; g is 0 of 1;

$R^1$ to $R^{18}$, $R^1$ and $R^b$ independently represent a hydrogen atom, a halogen atom or a hydrocarbon group;

$R^{15}$ to $R^{18}$ may be bonded together to form a monocyclic group or a polycyclic group which may have double bond(s);

and $R^{15}$ and $R^{16}$, or $R^{17}$ and $R^{18}$ may form an alkylidene group.

The laminate of the invention includes a laminate of a two-layer structure comprising a substrate and a resin surface layer laminated on at least one surface of the substrate and a laminate of a three-layer structure comprising a resin surface layer, a substrate and a back surface layer, laminated in this order.

The laminate of the invention has the resin layer applied to the surface having high surface glossiness. In the case that the laminate is provided, for example, on an expanded resin material, the laminate is placed on the expanded resin material in such a manner that the substrate of the laminate is in contact with the surface of the expanded resin material, whereby the resin surface layer of the laminate is not brought into direct contact with the expanded resin material. Further, the substrate is excellent in the resistance to fluorohydrocarbon gas, and accordingly, the characteristics of the resin surface layer are hardly influenced by an expanding agent contained in the expanded resin material. In other words, employment of the laminate of the invention makes it possible to obtain products having a surface layer hardly reduced in its characteristics.

DETAILED DESCRIPTION OF THE INVENTION

The laminate of the present invention is described below in more detail referring to examples.

Figure 1:
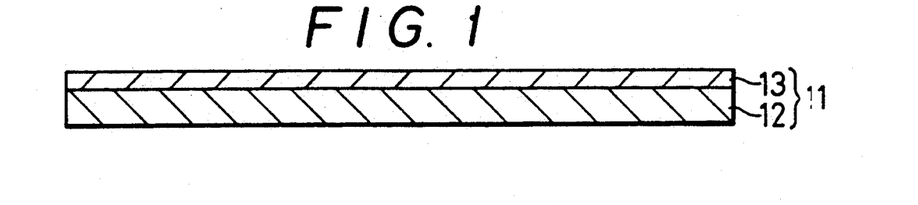
FIG. 1 is a sectional view illustrating sectional structure of one embodiment of the laminate according to the invention.

FIG. 1 shows sectional structure of the laminate of the present invention. As shown in FIG. 1, the laminate 11 of the invention comprises a substrate 12 made of a specific cycloolefin polymer [A] or a specific cycloolefin resin composition [B] and a resin surface layer 13 provided on at least one surface of the substrate 12.

As described above, the substrate 12 is formed from a specific cycloolefin polymer [A] or a specific cycloolefin resin composition [B]. The cycloolefin polymer is a resin having repeating units derived from cycloolefin represented by the following formula [I]:

[I]

wherein n is 0 or 1; m is 0 or a positive integer; q is 0 or 1. When q is 0, the ring represented by using "q" forms a five-member ring.

$R^1$ to $R^{18}$, $R^1$ and $R^b$ independently represent a hydrogen atom, a halogen atom or a hydrocarbon group, wherein the halogen includes, for example, fluorine, chlorine, bromine and iodine atoms, and the hydrocarbon group independently includes usually alkyl of 1–20 carbon atoms and cycloalkyl of 3–15 carbon atoms. Concrete examples of the alkyl include methyl, ethyl, propyl, isopropyl, amyl, hexyl, octyl, decyl, dodecyl and octadecyl, and concrete examples of the cyloalkyl includes cyclohexyl.

In the above-mentioned formula [I], $R^{15}$ and $R^{16}$, $R^{17}$ and $R^{18}$, $R^{15}$ and $R^{17}$, $R^{16}$ and $R^{18}$, and $R^{15}$ and $R^{18}$, or $R^{16}$ and $R^{18}$ may link together (in combination) to form a monocyclic group or a polycyclic group which may have double bond(s).

$R^{15}$ together with $R^{16}$, or $R^{17}$ together with $R^{18}$ may form an alkylidene of 2–20 carbon atoms, and concrete examples thereof include ethylidene, propylidene and isopropylidene.

The cycloolefins as mentioned above include:
bicyclo[2.2.1]hept-2-ene derivatives,
tetracyclo[4.4.0.1$^{2,5}$.1$^{7,10}$]-3-dodecene derivatives,
hexacyclo[6.6.1.1$^{3,6}$.1$^{10,13}$.0$^{2,7}$.0$^{9,14}$]-4-heptadecene derivatives,
octacyclo[8.8.0.1$^{2,9}$.1$^{4,7}$.1$^{11,18}$.1$^{13,16}$.0$^{3,8}$.0$^{12,17}$]-5-dodesene derivatives,
pentacyclo[6.6.1.1$^{3,6}$.0$^{2,7}$.0$^{9,14}$]-4-hexadecene derivatives,
heptacyclo-5-eicosene derivatives,
heptacyclo-5-heneicosene derivatives,
tricyclo[4.3.0.1$^{2,5}$]-3-decene derivatives,
tricyclo[4.3.0.1$^{2,5}$]-3-undecene derivatives,
pentacyclo[6.5.1.1$^{3,6}$.0$^{2,7}$.0$^{9,13}$]-4-pentadecene derivatives and
pentacyclopentadecadiene derivatives.

Concrete examples of the above-mentioned compounds are shown below.

Bicyclo[2.2.1]hept-2-ene derivative including such as those mentioned below.

Bicyclo[2.2.1]hept-2-ene

6-Methylbicyclo[2.2.1]hept-2-ene 5,6-Dimethylbicyclo[2.2.1]-hept-2-ene

1-Methylbicyclo[2.2.1]hept-2-ene

6-Ethylbicyclo[2.2.1]hept-2-ene 6-n-Butylbicyclo[2.2.1]hept-2-ene

6-Isobutylbicyclo[2.2.1]hept-2-ene

7-Methylbicyclo[2.2.1]hept-2-ene

Tetracyclo[4.4.0.1$^{2,5}$.1$^{7,10}$]-3-dodecene derivatives such as those mentioned below.

Tetracyclo[4.4.0.1$^{2,5}$.1$^{7,10}$]-3-dodecene

5,10-Dimethyltetracyclo[4.4.0.1$^{2,5}$.1$^{7,10}$]-3-dodecene

2,10-Dimethyltetracyclo[4.4.0.1$^{2,5}$.1$^{7,10}$]-3-dodecene

11,12-Dimethyltetracyclo[4.4.0.1$^{2,5}$.1$^{7,10}$]-3-dodecene

2,7,9-Trimethyltetracyclo[4.4.0.1$^{2,5}$.1$^{7,10}$]-3-dodecene

9-Ethyl-2,7-dimethyltetracyclo[4.4.0.1$^{2,5}$.1$^{7,10}$]-3-dodecene

9-Isobutyl-2,7-dimethyltetracyclo[4.4.0.1$^{2,5}$.1$^{7,10}$]-3-dodecene

9,11,12-Trimethyltetracyclo[4.4.0.1$^{2,5}$.1$^{7,10}$]-3-dodecene

9-Ethyl-11,12-dimethyltetracyclo[4.4.0.1$^{2,5}$.1$^{7,10}$]-3-dodecene

9-Isobutyl-11,12-dimethyltetracyclo[4.4.0.1$^{2,5}$.1$^{7,10}$]-3-dodecene

5,8,9,10-Tetramethyltetracyclo[4.4.0.1$^{2,5}$.1$^{7,10}$]-3-dodecene

8-Methyltetracyclo[4.4.0.1$^{2,5}$.1$^{7,10}$]-3-dodecene

8-Ethyltetracyclo[4.4.0.1$^{2,5}$.1$^{7,10}$]-3-dodecene

8-Propyltetracyclo[4.4.0.1$^{2,5}$.1$^{7,10}$]-3-dodecene

8-Hexyltetracyclo[4.4.0.1$^{2,5}$.1$^{7,10}$]-3-dodecene

8-Stearyltetracyclo[4.4.0.1$^{2,5}$.1$^{7,10}$]-3-dodecene

8,9-Dimethyltetracyclo[4.4.0.1$^{2,5}$.1$^{7,10}$]-3-dodecene

-continued

8-Ethyl-9-methyltetracyclo[4.4.0.1$^{2,5}$.1$^{7,10}$]-3-dodecene

8-Chlorotetracyclo[4.4.0.1$^{2,5}$.1$^{7,10}$]-3-dodecene

8-Bromotetracyclo[4.4.0.1$^{2,5}$.1$^{7,10}$]-3-dodecene

8-Fluorotetracyclo[4.4.0.1$^{2,5}$.1$^{7,10}$]-3-dodecene 8,9-Dichlorotetracyclo[4.4.0.1$^{2,5}$.1$^{7,10}$]-3-dodecene 8-Cyclohexyltetracyclo[4.4.0.1$^{2,5}$.1$^{7,10}$]-3-dodecene 8-Isobutyltetracyclo[4.4.0.1$^{2,5}$.1$^{7,10}$]-3-dodecene 8-Butyltetracyclo[4.4.0.1$^{2,5}$.1$^{7,10}$]-3-dodecene

Ethylidenetetracyclo-[4.4.0.1$^{2,5}$.1$^{7,10}$]-3-dodecene derivatives such as those mentioned below:

8-Ethylidenetetracyclo[4.4.0.1$^{2,5}$.1$^{7,10}$]-3-dodecene

8-Ethylidene-9-methyltetracyclo[4,4,0,1$^{2,5}$,1$^{7,10}$]-3-dodecene

8-Ethylidene-9-ethyltetracyclo[4.4.0.1$^{2,5}$.1$^{7,10}$]-3-dodecene

-continued

8-Ethylidene-9-isopropyltetracyclo[4.4.0.1$^{2,5}$.1$^{7,10}$]-3-dodecene

8-Ethylidene-9-butyltetracyclo[4.4.0.1$^{2,5}$.1$^{7,10}$]-3-dodecene

Propylidenetetracyclo-[4.4.0.1$^{2,5}$.1$^{7,10}$]-3-dodecene derivatives such as those mentioned below:

8-n-Propylidenetetracyclo[4.4.0.1$^{2,5}$.1$^{7,10}$]-3-dodecene 8-n-Propylidene-9-methyltetracyclo[4.4.0.1$^{2,5}$.1$^{7,10}$]-3-dodecene 8-n-Propylidene-9-ethyltetracyclo[4.4.0.1$^{2,5}$.1$^{7,10}$]-3-dodecene 8-n-Propylidene-9-isopropyltetracyclo[4.4.0.1$^{2,5}$.1$^{7,10}$]-3-dodecene 8-n-Propylidene-9-butyltetracyclo[4.4.0.1$^{2,5}$.1$^{7,10}$]-3-dodecene

Isopropylidenetetracyclo-[4.4.0.1$^{2,5}$.1$^{7,10}$]-3-dodecene derivatives such as mentioned below:

8-Isopropylidenetetracyclo[4.4.0.1$^{2,5}$.1$^{7,10}$]-3-dodecene

8-Isopropylidene-9-methyltetracyclo[4.4.0.1$^{2,5}$.1$^{7,10}$]-3-dodecene

8-Isopropylidene-9-ethyltetracyclo[4.4.0.1$^{2,5}$.1$^{7,10}$]-3-dodecene

8-Isopropylidene-9-isopropyltetracyclo[4.4.0.1$^{2,5}$.1$^{7,10}$]-3-dodecene

8-Isopropylidene-9-butyltetracyclo[4.4.0.1$^{2,5}$.1$^{7,10}$]-3-dodecene

Hexacyclo[6.6.1.1$^{3,6}$.1$^{10,13}$.0$^{2,7}$.0$^{9,14}$]-4-heptadecene derivatives such as those mentioned below.

Hexacyclo[6.6.1.1$^{3,6}$.1$^{10,13}$.0$^{2,7}$.0$^{9,14}$]-4-heptadecene

12-Methylhexacyclo[6.6.1.1$^{3,6}$.1$^{10,13}$.0$^{2,7}$.0$^{9,14}$]-4-heptadecene 12-Ethylhexacyclo[6.6.1.1$^{3,6}$.1$^{10,13}$.0$^{2,7}$.0$^{9,14}$]-4-heptadecene 12-Isobutylhexacyclo[6.6.1.1$^{3,6}$.1$^{10,13}$.0$^{2,7}$.0$^{9,14}$]-4-heptadecene 1,6,10-Trimethyl-12-isobutylhexacyclo[6.6.1.1$^{3,6}$.1$^{10,13}$.0$^{2,7}$.0$^{9,14}$]-4-heptadecene

Octacyclo[8.8.0.1$^{2,9}$.1$^{4,7}$.1$^{11,18}$.1$^{13,16}$.0$^{3,8}$.0$^{12,17}$]-5-docosene derivatives such as those mentioned below.

Octacyclo[8.8.0.1$^{2,9}$.1$^{4,7}$.1$^{11,18}$.1$^{13,16}$.0$^{3,8}$.0$^{12,17}$]-5-docosene 15-Methyloctacyclo[8.8.0.1$^{2,9}$.1$^{4,7}$.1$^{11,18}$.1$^{13,16}$.0$^{3,8}$.0$^{12,17}$]-5-docosene 15-Ethyloctacyclo[8.8.0.1$^{2,9}$.1$^{4,7}$.1$^{11,18}$.1$^{13,16}$.0$^{3,8}$.0$^{12,17}$]-5-docosene

Pentacyclo[6,6,1,1$^{3,6}$,0$^{2,7}$,0$^{9,14}$]-4-hexadecene derivatives such as those mentioned below.

Pentacyclo-[6,6,1,1$^{3,6}$,0$^{2,7}$,0$^{9,14}$]-4-hexadecene 1,3-Dimethylpentacyclo-[6,6,1,1$^{3,6}$,0$^{2,7}$,0$^{9,14}$]-4-hexadecene 1,6-Dimethylpentacyclo-[6,6,1,1$^{3,6}$,0$^{2,7}$,0$^{9,14}$]-4-hexadecene 15,16-Dimethylpentacyclo-[6,6,1,1$^{3,6}$,0$^{2,7}$,0$^{9,14}$]-4-hexadecene;

Heptacyclo-5-eicosene derivatives of heptacyclo-5-heneicosene derivatives such as those mentioned below.

Heptacyclo-[8.7.0.1$^{2,9}$.1$^{4,7}$.1$^{11,17}$.0$^{3,8}$.0$^{12,16}$]-5-eicosene Heptacyclo-[8.8.0.1$^{2,9}$.1$^{4,7}$.1$^{11,18}$.0$^{3,8}$.0$^{12,17}$]-5-heneicosene

Tricyclo[4,3,0,1$^{2,5}$]-3-decene derivatives such as those mentioned below.

Tricyclo[4.3.0.1$^{2,5}$]-3-decene

2-Methyltricyclo[4.3.0.1$^{2,5}$]-3-decene

5-Methyltricyclo[4.3.0.1$^{2,5}$]-3-decene

Tricyclo[4.4.0.1$^{2,5}$]-3-undecene derivatives such as those mentioned below.

Tricyclo[4.4.0.1$^{2,5}$]-3-undecene

10-Methyl-tricyclo[4.4.0.1$^{2,5}$]-3-undecene

Pentacyclo[6.5.1.1$^{3,6}$.0$^{2,7}$.0$^{9,13}$]-4-pentadecene derivatives such as those mentioned below.

Pentacyclo[6.5.1.1$^{3,6}$.0$^{2,7}$.0$^{9,13}$]-4-pentadecene 1,3-Dimethylpentacyclo-[6.5.1.1$^{3,6}$.0$^{2,7}$.0$^{9,13}$]-4-pentadecene 1,6-Dimethylpentacyclo-[6.5.1.1$^{3,6}$.0$^{2,7}$.0$^{9,13}$]-4-pentadecene

14,15-Dimethylpentacyclo-[6.5.1.1$^{3,6}$.0$^{2,7}$.0$^{9,13}$]-4-pentadecene Pentacyclo-pentadiene derivatives such as mentioned below:

Pentacyclo[6.5.1.1$^{3,6}$.0$^{2,7}$.0$^{9,13}$]-4,10-pentadecadiene

Pentacyclo[4.7.0.1$^{2,5}$.0$^{8,13}$.1$^{9,12}$]-3-pentadecene derivatives such as those mentioned below.

Pentacyclo[4.7.0.1$^{2,5}$.0$^{8,13}$.1$^{9,12}$]-3-pentadecene

Methyl-substituted pentacyclo[4.7.0.1$^{2,5}$.0$^{8,13}$.1$^{9,12}$]-3-pentadecene Heptacyclo[7,8,0,1$^{3.6}$,0$^{2,7}$,1$^{10.17}$,0$^{11.16}$,1$^{12.15}$]-4-eicosene derivatives such as those mentioned below.

Heptacyclo[7.8.0.1$^{3,6}$.0$^{2,7}$.1$^{10,17}$.0$^{11,16}$.1$^{12,15}$]-4-eicosene Dimethyl-substituted heptacyclo-[7.8.0.1$^{3,6}$.0$^{2,7}$.1$^{10,17}$.0$^{11,16}$.1$^{12,15}$]-4-eicosene Nonacyclo[9.10.1.1$^{4,7}$.0$^{3,8}$.0$^{2,10}$.0$^{12,21}$.1$^{13,20}$.0$^{14,19}$.1$^{15,18}$]-5-pentacosene derivatives such as those mentioned below.

Nonacyclo[9.10.1.1$^{4,7}$.0$^{3,8}$.
0$^{2,10}$.0$^{12,21}$.1$^{13,20}$.0$^{14,19}$.1$^{15,18}$]-
5-pentacosene Trimethyl-substituted
nonacyclo[9.10.1.1$^{4,7}$.0$^{3,8}$.
0$^{2,10}$.0$^{12,21}$.1$^{13,20}$.0$^{14,19}$.
1$^{15,18}$]-5-pentacosene.

Pentacyclo[8.4.0.1$^{2,5}$.1$^{9,12}$.0$^{8,13}$]-3-hexadecene derivatives such as those mentioned below.

Pentacyclo[8.4.0.1$^{2,5}$.1$^{9,12}$.0$^{8,13}$]-
3-hexadecene

11-Methylpentacyclo[8.4.0.1$^{2,5}$.
1$^{9,12}$.0$^{8,13}$]-3-hexadecene

11-Ethylpentacyclo[8.4.0.1$^{2,5}$.
1$^{9,12}$.0$^{8,13}$]-3-hexadecene 10,11-Dimethylpentacyclo[8.4.0.
1$^{2,5}$.1$^{9,12}$.0$^{8,13}$]-3-hexadecene

Heptacyclo[8.8.0.1$^{4,7}$.1$^{11,18}$.1$^{13,16}$.0$^{12,17}$]-5-heneicosene derivatives such as those mentioned below.

Heptacyclo[8.8.0.1$^{4,7}$.1$^{11,18}$.
1$^{13,16}$.0$^{3,8}$.0$^{12,17}$]-5-heneicosene 15-Methylheptacyclo[8.8.0.1$^{4,7}$.
1$^{11,18}$.1$^{13,16}$.0$^{3,8}$.0$^{12,17}$]-5-
heneicosene Trimethyl-substituted heptacyclo
[8.8.0.1$^{4,7}$.1$^{11,18}$.1$^{13,16}$.0$^{3,8}$.
0$^{12,17}$]-5-heneicosene Nonacyclo
[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as those mentioned below.

Nonacyclo [10.10.1.1$^{5,8}$.
1$^{14,21}$.1$^{16,19}$.0$^{2,11}$.0$^{4,9}$.
0$^{13,22}$.0$^{15,20}$]-6-hexacosene Such cycloolefins as represented above may be prepared by condensing cyclopentadienes with corresponding olefins through Diels-Adler reaction.

The resin for forming the substrate of the present invention is a cycloolefin polymer [A] or a cycloolefin resin composition [B].

The cycloolefin polymer [A] is a resin selected from a group consisting of:

(a-1) a random copolymer of ethylene and a cycloolefin represented by the formula [I] (hereinafter the copolymer is sometimes abbreviated to a "cycloolefin random copolymer".), (a-2) a ring-opening polymer of a cycloolefin represented by the formula [I], (a-3) a ring-opening copolymer of cycloolefins represented by the formula [I], (a-4) a hydrogenation product of the ring-opening polymer or the ring-opening copolymer, (a-5) an unsaturated carboxylic acid graft-modified product of the above (a-1), (a-2), (a-3) or (a-4), and (a-6) a crosslinked product of the above (a-5).

These resins may be employed alone or in combination.

The cycloolefin resin composition [B] comprises the cycloolefin polymer [A] and a crystalline polyolefin and/or an α-olefin elastomeric copolymer.

The cycloolefin random copolymer [a-1] is a random copolymer of ethylene and the cycloolefin represented by the formula [I]. However, the cycloolefin random copolymer used in the present invention may contain units derived from other unsaturated monomers within the range where the objects of the invention are not marred. Examples of the unsaturated monomer include an α-olefin having 3-20 carbon atoms and a hydrocarbon monomer having at least two C=C bonds in a molecule. The α-olefins having 3-20 carbon atoms include propylene, 1-butene, 4-methyl-1-pentene, 1-hexene, 1-octene, 1-decene, 1-dodecene, 1-tetradecene, 1-hexadecene, 1-octadecene and 1-eicosene. Examples of hydrocarbon monomers having at least two C=C bonds in a molecule are non-conjugated dienes such as 1,4-hexadiene, 4-methyl 1,4-hexadiene, 5-methyl-1,4-hexadiene, 1,7-octadiene, dicylopentadiene, 5-ethylidene-2-norbornene and 5-vinyl-2-norbornene; and norbornene compounds such as norbornene-2,5-methylnorbornene-2, 5-ethylnorbornene-2, 5-isopropylnorbornene-2, 5-n-butylnorbornene-2, 5-iso-butylnorbornene-2, 5,6-dimethylnorbornene-2, 5-chloronorbornene-2, 2-fluoronorbornene-2 and 5,6-dichloronorbornene-2. Among the compounds, 1,4-hexadiene, 1,6-octadiene and cyclic non conjugated diene, especially dicylopentadiene, 5-ethylidene-2-norbornene, 5-vinyl-2-norbornene, 5-methylene-2-norbornene, 1,4-hexadiene and 1,6-ocatadiene, are preferable. In addition, in the present invention, cycloolefin, such as cyclopentene, cyclohexene, 3-methylcyclohexene, cyclooctene, 3a,5,6,7a-tetrahydro-4,7-methano-1H-indene, etc., may also be copolymerized.

The copolymerization reaction of the above-mentioned ethylene and the cycloolefin having the formula [I] is usually carried out in a hydrocarbon solvent. Examples of the hydrocarbon solvents employed in the invention include aliphatic hydrocarbons, alicyclic hydrocarbons and aromatic hydrocarbons. Moreover, among the polymerizable unsaturated monomers used in the preparation of the cycloolefin random copolymer, monomers which are liquid at a reaction condition may also be used as a reaction solvent. The solvents can be employed alone or in combination.

A catalyst generally comprising a vanadium compound which is soluble in a reaction solvent and an organoaluminum compound may be used in the copolymerization reaction of ethylene and the cycloolefins having the formula [I].

As the vanadium compounds used as a catalyst in the copolymerization, there can be mentioned compounds having the formula $$VO(OR)_a X_b \text{ or}$$

$$V(OR)_c X_d,$$

wherein R is a hydrocarbon group, and a, b, c and d are numbers satisfying $0 \leq a \leq 3$, $0 \leq b \leq 3$, $2 \leq a+b \leq 3$, $0 \leq c \leq 4$, $0 \leq d \leq 4$ and $3 \leq c+d \leq 4$.

Moreover, the vanadium compounds used in the invention may be adducts of the vanadium compound of the above formula and an electron donor. The electron donors used for forming the adduct are, for example, alcohols having 1-18 carbon atoms, phenols having 6-20 carbon atoms (phenols may contain lower alkyl groups), ketones having 3-15 carbon atoms, aldehydes having 2-15 carbon atoms, esters of organic acids having 2-30 carbon atoms, acid halides having 2-15 carbon atoms, ethers, amines and alkoxysilanes having 2-20 carbon atoms. The illustrated electron donors can be used alone or in combination.

The organoaluminum compounds used as the catalyst in the invention are compounds having at least one Al-C bond in the molecule.

One example of such organoaluminum compounds is represented by the formula (i):

$$R^1{}_m Al(OR^2)_n H_p X_q \qquad (i)$$

wherein $R^1$ and $R^2$ each independently represent a hydrocarbon group having normally from 1 to 15, preferably from 1 to 4 carbon atoms; X is halogen; and m, n, p and q are numbers satisfying $0 \leq m \leq 3$, $0 \leq n < 3$, $0 \leq p < 3$, $0 \leq q < 3$, and $m+n+p+1=3$.

Another example of such compounds is a complex alkyl compound of aluminum and a metal of Group I, represented by the formula (ii):

$$M^1 Al R^1{}_4 \qquad (ii).$$

wherein $M^1$ is Li, Na or K, and $R^1$ is the same as above.

The vanadium compounds are used in such a manner that the concentration of the vanadium compounds in the reaction system is normally 0.01-5 gram atom/liter, preferably 0.05-3 gram atom/liter in terms of vanadium atoms. The organoaluminum compounds are used in such a manner that the ratio of aluminum atoms to vanadium atoms (Al/V) in the polymerization system is normally at least 2, preferably 2-50, and particularly preferably 3-20.

The cycloolefin random copolymer (a-1) obtained by using the above-mentioned catalyst generally contains repeating units derived from ethylene in an amount of 52 to 90 mol %, preferably 55 to 80 mol %, and repeating units derived from a cycloolefin in an amount of 10-48 mol %, preferably 20 to 45 mol %. When the cycloolefin random copolymer contains repeating units derived from α-olefin other than ethylene, the amount of the repeating units derived from this α-olefin contained in the cycloolefin random copolymer is generally not more than 20 mol %, preferably not more than 10 mol %.

In the cycloolefin random copolymer (a-1) used in the invention, the repeating units derived from ethylene and the repeating units derived from cycloolefin are substantially linearly arranged, and those repeating units are arranged at random. It has been confirmed that the cycloolefin random copolymer is in the substantially linear form and does not have a gel crosslinking structure, because the cycloolefin random copolymer is completely dissolved in Decalin ® (Dupont - decahydronaphthalene) at 135° C.

In the cycloolefin random copolymer prepared as above, it is considered that cycloolefin [I] forms repeating units represented by the following formula [II]:

[II]

wherein m, n, q, $R^1$-$R^{18}$, $R^a$ and $R^b$ have the same meanings as defined in the aforementioned formula [I].

The ring opening polymer (a-2) of cycloolefin and the ring opening copolymer (a-3) of cyclo-olefin(s) used in the invention can be prepared by polymerizing or copolymerizing the cycloolefin represented by the formula [I] in the presence of a catalyst comprising halide of metals such as ruthenium, rhodium, palladium, osmium, indium and platinum, nitrate of these metals or an acetylacetone compound of these metals and a reducing agent, or a catalyst comprising halide of metals such as titanium, palladium, zirconium and molybdenum or an acetylacetone compound of these metals and an organoaluminum.

In the ring opening polymer or copolymer of the cyclo-olefin(s) prepared as above, it is considered that cycloolefin [I] forms repeating units represented by the following formula [III]:

[III]

wherein m, n, q, $R^1$ to $R^{18}$, $R^a$ and $R^b$ have the same meanings as defined in the aforementioned formula [I].

The hydrogenation product (a-4) of the above-mentioned ring opening polymer (a-2) or ring opening copolymer (a-3) can be prepared by reducing the ring opening polymer (a-2) or the ring opening copolymer (a-3) with hydrogen in the presence of a hydrogenation catalyst.

In the hydrogenation product (a-4) of the cycloolefin ring opening polymer or copolymer prepared as above, it is considered that cycloolefin [I] forms repeating units represented by the following formula [IV]:

[IV]

wherein m, n, q, $R^1$ to $R^{18}$, $R^a$ and $R^b$ have the same meanings as defined in the aforementioned formula [I].

The above-mentioned cycloolefin polymer [A] can be prepared according to processes descried, for example, in Japanese Patent Laid-open Publications No. 60(1985)-168708, No. 61(1986)-120816, No. 61(1986)-115912, No. 61(1986)-115916, No. 61(1986)-271308, No. 61(1986)-272216 and No. 62(1987)-252406, selecting appropriate reaction conditions.

In the invention, employable as the cycloolefin polymer [A] is any of the cycloolefin random copolymer (a-1), the ring opening cycloolefin polymer (a-2), a ring opening cycloolefin copolymer (a-3), the hydrogenation product (a-4) of the ring opening polymer or the ring opening copolymer, an unsaturated carboxylic acid graft-modified product (a-5) of the above (a-1), (a-2), (a-3) or (a-4), and a crosslinked product (a-6) of the above (a-5).

The unsaturated carboxylic acid graft-modified product (a-5) is a product obtained by graft-modifying the cycloolefin random copolymer (a-1), the ring opening cycloolefin polymer (a-2), the ring opening cycloolefin copolymer (a-3) or the hydrogenation product (a-4) of the above (a-2) or (a-3) with an unsaturated carboxylic acid or its derivative (graft monomer).

Examples of the unsaturated carboxylic acids used herein include acrylic acid, maleic acid, fumaric acid, tetrahydrophthalic acid, itaconic acid, citraconic acid, crotonic acid, isocrotonic acid and nadic acid TM (endocis-bicyclo[2,2,1]hepto-5-ene-2,3-dicarboxylic acid). Examples of the derivatives of the unsaturated carboxylic acids include unsaturated carboxylic anhydride, unsaturated carboxylic halide, unsaturated carboxylic amide, unsaturated carboxylic imide and esters of unsaturated carboxylic acids. Concrete examples of the derivatives include maleyl chloride, maleimide, maleic anhydride, citraconic anhydride, monomethyl maleate, dimethyl maleate, glycidyl maleate, glycidyl acrylate and glycidyl methacrylate. These graft monomers can be employed singly or in combination.

Among the above-mentioned graft monomers, preferred are unsaturated dicarboxylic acid and anhydrides thereof, and particularly preferred are maleic acid, Nadic Acid TM (Allied - bicyclo[2.2.1]heptene-2,3 dicarboxyic acid) and anhydrides thereof.

The unsaturated carboxylic acid graft-modified product (a-5) can be prepared by modifying the unmodified cycloolefin random copolymer (a-1), ring opening cycloolefin polymer (a-2), ring opening cycloolefin copolymer (a-3) or hydrogenation product (a-4) of the above (a-2) or (a-3) with the above-mentioned graft monomers by conventional modification processes. For example, there can be used a process of melting the cycloolefin random copolyer, etc. and adding a graft monomer thereto to perform graft polymerization, or a process of dissolving the cycloolefin random copolymer, etc. in a solvent and adding a graft monomer to the resulting solution to perform graft copolymerization. For preparing a graft-modified product, there is known a process of modifying a polymer by adding a graft monomer to an unmodified polymer so that the polymer might have a desired graft-modification degree, or a process of initially preparing a graft-modified product having a high graft-modification degree and then diluting the graft-modified product of high graft-modification degree with an unmodified polymer to obtain a graft-modified product having a desired modification degree. In the invention, a graft-modified product prepared by any of those processes can be employed. The modification degree of the graft-modified product employable in the invention is generally in the range of 0.01 to 5 % by weight, preferably 0.1 to 4 % by weight. The graft reaction is generally carried out at a temperature of 200 to 300° C.

This reaction is preferably carried out in the presence of an organic peroxide By virtue of using the organic peroxide, not only the above-mentioned graft monomer can be efficiently reacted, but also a crosslinking structure can be formed in the cycloolefin polymer. Thus crosslinked and modified cycloolefin polymer (a-6) shows prominently high resistance to fluorohydrocarbon gas.

The organic peroxide is used in an amount of generally in the range of 0.001 to 5 parts by weight based on 100 parts by weight of the unmodified polymer.

Preferred examples of the organic peroxides used herein include organic peroxides and organic peresters. Concrete examples of such peroxides and peresters include benzoyl peroxide, dichlorobenzoyl peroxide, dicumyl peroxide, di-tert-butyl peroxide, 2,5-dimethyl-2,5-di(peroxybenzoate)hexyne-3, 1,4-bis(tert-butyl-peroxyisopropyl)benzene, lauroyl peroxide, tert-butyl peracetate, 2,5-dimethyl-2,5-di(tert-butylperoxy)hexyne-3, 2,5-dimethyl-2,5-di(tert-butylperoxy)hexane, tert-butyl perbenzoate, tert-butylperphenyl acetate, tert-butyl perisobutylate, tert-butylper-sec-octoate, tert-butyl perpivalate, cumyl perpivalate and tert-butylperdiethyl acetate.

Of these, preferably used are dialkyl peroxides such as benzoyl peroxide, dicumyl peroxide, di-tert-butyl peroxide, 2,5-dimethyl-2,5-di(tert-butylperoxy)hexyne-3, 2,5-dimethyl-2,5-di(tert-butylperoxy)hexane and 1,4-bis(tert-butylperoxyisopropyl)benzene.

The cycloolefin polymer [A] has an intrinsic viscosity $[\eta]$ of generally 0.01 to 10 dl/g, preferably 0.05 to 5 dl/g, when measured at 135° C. in decalin.

Further, the cycloolefin polymer [A] has a softening temperature (TMA) of generally not lower than 70° C., preferably in the range of 90 to 250° C., more preferably in the range of 100 to 200° C., when measured using a thermo-mechanical analyzer, and has a glass transition temperature (Tg) of generally 50 to 230° C., preferably 70 to 210° C. The crystallinity of the cycloolefin polymer is generally in the range of 0 to 10%, preferably 0 to 7%, more preferably 0 to 5%, when measured by an X-ray diffraction method.

The substrate of the laminate of the invention may be formed from either the above-mentioned cycloolefin polymer [A] or a cycloolefin resin composition [B] comprising the cycloolefin polymer [A] and a crystalline polyolefin and/or an $\alpha$-olefin elastomeric copolymer.

As the crystalline polyolefin, homopolymers of ethylene or copolymers of ethylene and $\alpha$-olefins other than ethylene can be employed.

As the $\alpha$-olefins other than ethylene employable for preparing the crystalline polyolefin in the invention, there can be generally mentioned $\alpha$-olefins having 3-20 carbon atoms. Concrete examples of such $\alpha$-olefins include propylene, 1-butene, 4-methyl-1-pentene, 1-hexene, 1-octene, 1-decene, 1-dodecene, 1-tetradecene, 1-hexadecene, 1-octadecene and 1-eicosene. They can be employed alone or in combination. Of these -olefins, preferred are propylene, 1-butene, 4-methyl-1-pentene and 1-hexene. The content of the repeating units derived from the above-mentioned $\alpha$-olefins in the crystalline polyolefin is generally in the range of 0 to 45% by mole, preferably in the range of 1 to 35% by mole. In the polymerization reaction, other polymerizable monomers (e.g., vinyl acetate and acrylic ester) can be copolymerized with the above components in such a small amount (e.g., not more than 10% by weight) that the characteristics of the crystalline polyolefin are not marred.

The polyolefin having the above-mentioned composition is crystalline, and the crystallinity thereof is generally not less than 40%, preferably not less than 50%, particularly preferably in the range of 55 to 85%.

The crystalline polyolefin used in the invention has a melt flow rate in the range of 0.1 to 35 g/10 min., preferably in the range of 0.5 to 30 g/10 min., when measured in accordance with ASTM-D-1238E.

The glass transition temperature of the crystalline polyolefin is generally in the range of 60 to 30° C., preferably in the range of −40 to 10° C.

The density of the crystalline polyolefin is generally in the range of 0.84 to 0.97 g/cm:, preferably 0.85 to 0.95 g/cm$^3$.

Accordingly, the crystalline polyolefin employable in the invention includes low-density linear polyethylene (LLDPE) and ultra-low-density linear polyethylene.

The crystalline polyolefin can be prepared utilizing any known process such as the high pressure process, the moderate pressure process and the low pressure process. Further, the crystalline polyolefin may be prepared in either a gas phase reaction or a liquid phase reaction.

An example of the processes for preparing the crystalline polyolefin is described below.

As the catalysts employable in the preparation of the crystalline polyolefin used in the invention, there can be mentioned olefin polymerization catalysts which contain both a solid catalyst component prepared by bringing a Ti compound, a Zr compound, a V compound or a Hf compound (and a Mg compound, if necessary) into contact with an electron donor (inside donor) and an organic compound catalyst component of a metal of Group I to Group III in the periodic table (e.g., organoaluminum catalyst component). The olefin polymerization catalysts can be further brought into contact with an electron donor (outside donor). Otherwise, the above-mentioned solid catalyst component is brought into contact with a small amount of α-olefin to perform pre-polymerization so as to obtain a pre-polymerized catalyst component, which is then brought into contact with the above-mentioned organic compound catalyst component of a metal of Group I to Group III in the periodic table, to prepare an olefin polymerization catalyst. Thus prepared olefin polymerization catalyst can be also employed.

A polymerization process using the above-mentioned olefin polymerization catalyst will be described below exemplifying a process for preparing the crystalline polyolefin through a gaseous phase method accompanied by a pre-polymerization stage.

Generally in the pre polymerization, to a reaction solvent are added a solid catalyst component and an organic compound of a metal of Group I to Group III in the periodic table (and an electron donor, if desired) to pre-polymerize a small amount of α-olefin having 2-10 carbon atoms. The temperature for the pre-polymerization is generally in the range of $-40$ to $80°$ C., preferably $-20$ to $40°$ C., more preferably $-10$ to $30°$ C.

Subsequently, using the pre-polymerized catalyst prepared as above, main polymerization (also referred to as "polymerization" simply hereinafter) is carried out. The temperature for the polymerization is generally in the range of 20 to $130°$ C., preferably 50 to $120°$ C., more preferably 70 to $110°$ C., and the pressure therefor is generally in the range of 1 to 50 kg/cm$^2$, preferably 2 to 30 kg/cm$^2$, more preferably 5 to 20 kg/cm$^2$.

In the polymerization, a monomer is polymerized in an amount of 1,000 to 100,000 g, preferably 2,000 to 50,000 g, more preferably 3,000 to 30,000 g, per 1 g of the titanium catalyst component contained in the catalyst obtained by the pre-polymerization of α-olefin.

This polymerization can be carried out using any of a batch process, a semi-continuous process and a continuous process.

The α-olefin elastomeric copolymer used in the invention generally has a tensile modulus of 0.1 to 20,000 kg/cm$^2$, preferably 1 to 15,000 kg/cm$^2$.

The glass transition temperature (Tg) of the α-olefin elastomeric copolymer is generally in the range of $-150$ to $+50°$ C., preferably $-80$ to $-20°$ C. Further, it is desired that the intrinsic viscosity [η] of the α-olefin elastomeric copolymer is generally in the range of 0.2 to 10 dl/g, preferably 1 to 5 dl/g, when measured in decalin at $135°$ C. The density of the α-olefin elastomeric copolymer is generally in the range of 0.82 to 0.96 g/cm$^3$, preferably 0.84 to 0.92 g/cm. The crystallinity of the α-olefin elastomeric copolymer generally is not more than 90%, preferably not more than 25%, when measured according to an X-ray diffraction method, and this α-olefin elastomeric copolymer is desired to be a low crystalline copolymer or a non-crystalline copolymer.

Concrete examples of the α-olefin elastomeric copolymers used in the invention include:

(a) ethylene/α-olefin copolymer rubber, and
(b) propylene/α-olefin copolymer rubber.

These ethylene/α-olefin copolymer rubber (a) and propylene/α-olefin copolymer rubber (b) can be employed singly or in combination.

The α-olefins constituting the ethylene/α-olefin copolymer rubber (a) generally are α-olefins of 3–20 carbon atoms, for example, propylene, 1-butene, 1-pentene, 1-hexene, 4-methyl-1-pentene, 1-octene, 1-decene and mixtures thereof. Of these, particularly preferred are propylene and 1-butene.

αThe -olefins constituting the propylene/α-olefin copolymer rubber (b) generally are α-olefins of 4–20 carbon atoms, for example, 1-butene, 1-pentene, 1-hexene, 4-methyl 1-pentene, 1-octene, 1-decene and mixtures thereof. Of these, particularly preferred is 1-butene.

The α-olefin elastomeric copolymer used in the invention may contain other repeating units than the repeating units derived from -olefins, such as repeating units derived from diene compounds, provided that the characteristics of the α-olefin copolymer are not marred.

For example, the repeating units permitted to be contained in the α-olefin copolymer used in the invention are:

repeating units derived from chain non-conjugated dienes such as 1,4-hexadiene, 1,6-octadiene, 2-methyl-1,5-hexadiene, 6 methyl-1,5-heptadiene and 7-methyl-1,6-octadiene;

repeating units derived from cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene;

repeating units derived from diene compounds such as 2,3-diisopropylidene-5-norbornene, 2-ethylidene-3-isopropylidene-5-norbornene and 2-propenyl-2,2-norbornadiene.

The content of the repeating units derived from such dienes is generally not more than 10% by mole, preferably not more than 5% by mole.

In the ethylene/α-olefin copolymer rubber (a) used in the invention, a molar ratio of ethylene to α-olefin (ethylene/α-olefin) is generally in the range of 30/70 to 95/5, preferably 50/50 to 95/5, though it varies depending on the kind of the α-olefin used. This molar ratio is preferably in the range of 50/50 to 90/10 when the α-olefin is propylene, and is preferably in the range of 80/20 to 95/5 when the α-olefin is α-olefin having 4 or more carbon atoms.

In the propylene/α-olefin copolymer rubber (b) used in the invention, a molar ratio of propylene to α-olefin (propylene/α-olefin) is generally in the range of 50/50 to 95/5, though it varies depending on the kind of the used α-olefin. This molar ratio is preferably in the range of 50/50 to 90/10 when the α-olefin is 1-butene, and is preferably in the range of 80/20 to 95/5 when the α-olefin is α-olefin having 5 or more carbon atoms.

Among the α-olefin elastomeric copolymers mentioned as above, preferably used in the invention is an ethylene/propylene random copolymer or an ethylene/α-olefin random copolymer having ethylene content of 35 to 50% by mole and crystallinity of not more than 10%.

As the cycloolefin resin composition [B] forming the substrate of the laminate of the invention, there can be employed a composition comprising the crystalline polyolefin mentioned as above and the aforementioned cycloolefin polymer [A], a composition comprising the α-olefin elastomeric copolymer mentioned as above and the cycloolefin polymer [A], and a composition comprising the crystalline polyolefin, the α-olefin elastomeric copolymer and the cycloolefin polymer [A].

In the case of using a composition comprising the crystalline polyolefin and the cycloolefin polymer [A], a ratio by weight between the crystalline polyolefin and the cycloolefin polymer [A] in the composition is generally in the range of 90:10 to 5:95, more preferably 80:20 to 10:90. In the case of using a composition comprising the α-olefin elastomeric copolymer and the cycloolefin polymer [A], a ratio by weight between the -olefin elastomeric copolymer and the cycloolefin polymer [A] is generally in the rage of 40:60 to 1:99, preferably 30:70 to 5:95. In the case of using a composition comprising the crystalline polyolefin, the α-olefin elastomeric copolymer and the cycloolefin polymer [A], a ratio by weight between the amount of the cycloolefin polymer [A] and the total amount of the crystalline polyolefin and the α-olefin elastomeric copolymer is generally in the range of 90:10 to 5:95, preferably 80:20 to 10:90, and in this case, a ratio by weight between the crystalline polyolefin and the α-olefin elastomeric copolymer is generally in the range of 1:99 to 99:1, preferably 5:95 to 95:5.

The resin of the substrate may have a crosslinked structure. For forming a crosslinked structure in the resin of the substrate, various processes can be employed. For example, in the case of forming a crosslinked structure through an oxidation treatment, an organic peroxide is added to the resin, and they are well mixed and then heated to a temperature of not lower than a decomposition temperature of the organic peroxide in the presence of oxygen, to form a crosslinked structure within resin particles. In this case, the resin may be modified with unsaturated carboxylic acids, etc.

Examples of the organic peroxides used herein include dichlorobenzoyl peroxide, dicumyl peroxide, di-tert-butyl peroxide, 2,5-dimethyl-2,5-bis(tert-butylperoxy)hexane, 2,5-dimethyl-2,5-bis(tert-butylperoxy)-hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, dibenzoyl peroxide, tert-butylperoxy benzoate, tert butylperoxy-2-ethylhexanoate, cyclohexanone peroxide, 2,5-dimethyl-2,5-dibenzoyl peroxyhexane, tert-butyl peroxybenzoate, di-tert-butyl diperoxyphthalate and methyl ethyl ketone peroxide.

These organic peroxides are generally used in an amount of 0.001 to 10 parts by weight, preferably 0.01 to 5 parts by weight, per 100 parts by weight of the resin to be oxidized. The oxidation reaction mentioned as above can be performed either in the case that the resin is in the particulate form or in the case that the resin is dissolved or dispersed in a solvent.

For example, for the formation of a crosslinked structure using a resin of the particulate form, a solution of the organic peroxide in a small amount of an organic solvent and the particulate resin are mixed and caused to react with each other to form a crosslinked structure in the particulate resin. There is no specific limitation on the organic solvents used in this stage, provided that they can dissolve the organic peroxide. For example, there can be employed aromatic hydrocarbon solvents, aliphatic hydrocarbon solvents, chlorinated hydrocarbon solvents, alcohol solvents, ketone solvents, ester solvents and ether solvents. The reaction temperature for forming the crosslinking structure using the resin particles and the organic peroxide is a temperature of not lower than the decomposition temperature of the organic peroxide, preferably a temperature in the range of 50 to 140° C., more preferably a temperature in the range of 60 to 120° C.

As mentioned above, the substrate of the laminate of the invention is formed from the cycloolefin polymer [A] or the cycloolefin resin composition [B]. The thickness of the substrate can be appropriately determined depending on the uses of the laminate, but generally is in the range of 0.1 to 10 mm, preferably 0.5 to 5 mm.

Polymers having repeating units derived from the cycloolefin as mentioned above or the composition comprising such polymers show excellent resistance to fluorine-containing solvents. Specifically, the substrate composed of the cycloolefin polymer [A] is preferable.

In the laminate of the invention, on at least one surface of the above-mentioned substrate is provided a resin surface layer having a glossiness (as measured at an incidence angle of 60°) of not less than 60%, preferably not less than 70%, more preferably not less than 80%. In the invention, the glossiness is measured when the incidence angle $\theta$ is set to 60° using a glossmeter (trade name: 100DP, produced by Nippon Denshoku Co., Ltd.).

Examples of the resins generally used in the invention for forming a surface resin layer having the above-mentioned glossiness include polystyrene, an acrylonitrile/-butadiene/styrene copolymer, polycarbonate, polyalkylene terephthalate, polyvinyl chloride, polyamide, the aforementioned cycloolefin polymer [A], and a cycloolefin resin composition [B] comprising the cycloolefin polymer [A] and crystalline polyolefin and/or α-olefin elastomeric copolymer. These resins can be employed singly or in combination.

The polystyrene may be homopolymers of styrene or may be high impact polystyrene containing a rubber latex or a synthetic rubber.

As the acrylonitrile/butadiene/styrene copolymer (ABS resin), in addition to copolymers of acrylonitrile, butadiene and styrene, copolymers wherein other diene compounds are copolymerized instead of butadiene or together with butadiene can be employed. Further, there can be also employed acrylonitrile/styrene copolymers wherein no diene compound is used.

Polycarbonate used herein is the general term for high molecular compounds having a main structure represented by the formula —[O—R—O—CO—]$_n$— wherein R is a repeating unit derived from aromatic diol compounds such as bisphenol A and bisphenol F.

A representative example of the polyalkylene terephthalate is polyethylene terephthalate. In the invention, a part of the repeating units which are derived from terephthalic acid and constitute polyethylene terephthalate may be replaced by repeating units derived from isophthalic acid or naphthalenedicarboxylic acid.

The polyvinyl chloride may be homopolymers of vinyl chloride, or may be copolymers having repeating units derived from vinyl chloride as main repeating units. Concrete examples of such copolymers are ethylene/vinyl chloride copolymers and ethylene/vinyl acetate/vinyl chloride graft modified resins.

As the polyamide, employable are nylon 6, nylon 66, nylon 610, nylon 612, nylon 11, nylon 12, nylon MXD6, copolymerized nylon, nylon 46, nylon 636 and methoxymethylated polyamide.

As the cycloolefin polymer and the cycloolefin resin composition for forming the surface resin layer, preferably employable are those having excellent surface glossiness among the polymers and compositions described before with respect to the substrate.

In the invention, preferred are polyamide, polystyrene, acrylonitrile/butadiene/styrene copolymer, polycarbonate, polyethylene terephthalate and polyvinyl chloride. For forming the resin surface layer, particularly preferred are polyamide, the aforementioned cycloolefin polymer [A] and the resin composition [B] composed of the cycloolefin polymer [A], crystalline polyolefin and/or α-olefin resin copolymer.

In the laminated sheet of the invention, however, the substrate and the resin surface layer are not formed from the same resin. In other words, the resin for forming the substrate and the resin for forming the resin surface layer are different from each other, for example, different in at least their compositions. Accordingly, the laminate of the invention takes a structure of two or more layers made of at least two kinds of resins.

Figure 2:
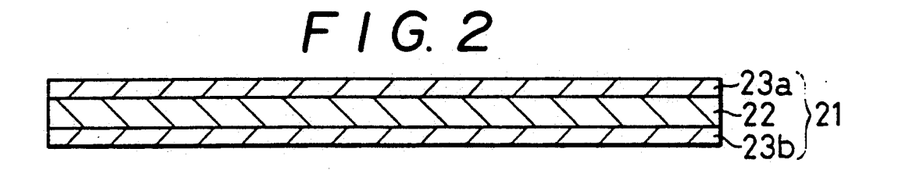
FIG. 2 is a sectional view illustrating sectional structure of another embodiment of the laminated sheet according to the invention.

For example, as shown in FIG. 2, the laminate 21 of the invention may have a three-layer structure consisting of a substrate 22 and resin surface layers 23a, 23b which are provided on both of the substrate 22.

Figure 4:
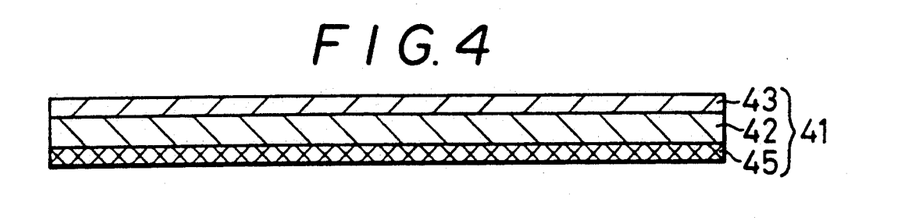
FIG. 4 is a sectional view illustrating sectional structure of an example of the laminate having a back surface layer according to the invention.

Further, in the laminate 41 of the invention, as shown in FIG. 4, a resin surface layer 43 can be arranged on one surface of the substrate 42, and a back surface layer 45 can be arranged on the other surface of the substrate 42 where the resin surface layer 43 is not provided (i.e., back surface).

The back surface layer 45 is preferably formed from the cycloolefin polymer [A] or the cycloolefin resin composition [B]. More preferably, the back surface layer 45 is formed from the cycloolefin resin composition [B]. The cycloolefin resin composition [B] comprises the cycloolefin polymer [A], the crystalline polyolefin and/or the α-olefin elastomeric copolymer, as described before. The back surface layer 45 may be formed from any composition containing those components, but particularly preferable is a back surface layer 45 formed from a resin composition composed of the crystalline polyolefin and the cycloolefin polymer [A]. The cycloolefin polymer [A] used herein may be either a modified cycloolefin polymer or a unmodified cycloolefin polymer, but a modified cycloolefin polymer is preferred. When the cycloolefin polymer [A] is a modified product, the modified product may have a crosslinked structure.

In the case of providing the back surface layer 45 as described above, the resin for forming the back surface layer 45 is different from the resin for forming the substrate 42.

The thickness of the resin surface layer is generally in the range of 50 to 500 μm, preferably 100 to 300 μm, more preferably 150 to 200 μm. Further, in the case of providing the above-mentioned back surface layer, the thickness of the back surface layer is generally in the range of 50 to 500 μm, preferably 100 to 300 μm, more preferably 150 to 200 μm.

The thickness of the whole laminate of the invention (i.e., total thickness of the resin surface layer, the substrate and the optionally provided back surface layer) can be appropriately determined depending on the uses of the laminate, but generally is not more than 5 mm, preferably not more than 3 mm.

The laminate of the invention having the constitution mentioned above can be produced by first preparing a resin sheet for forming a resin surface layer and a resin sheet for forming a substrate separately, and then bonding those resin sheets with an adhesive. Otherwise, the laminate of the invention can be produced more efficiently utilizing a dry laminating process or an extrusion laminating process.

Figure 3:
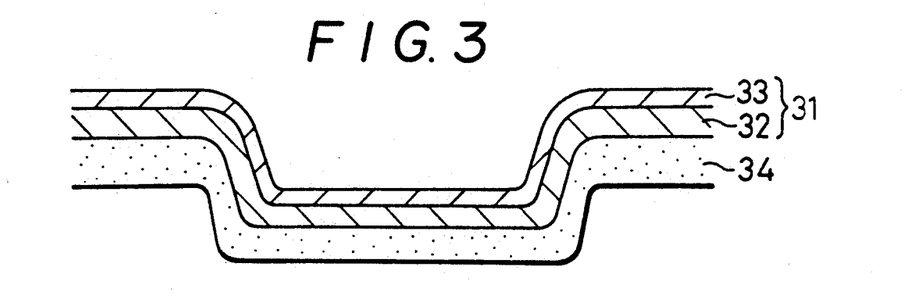
FIG. 3 is a sectional view illustrating sectional structure of an example of the laminate of the invention which is put on an expanded resin layer.

As shown in FIG. 3, the laminate 31 of the invention prepared as above is provided on an expanded resin layer 34 obtained by expanding a resin using a fluorine-containing solvent as an expanding agent in such a manner that the substrate 32 of the laminate 31 is brought into contact with the surface of the expanded resin layer 34. As described hereinbefore, the resin for forming the substrate has excellent resistance to fluorine-containing solvents, so that the resin of the substrate 32 is not marred by the fluorine-containing solvent of the expanded resin layer 34, and therefore the resin surface layer 33 laminated on the substrate 32 can be effectively prevented from occurrence of cracks.

Figure 5:
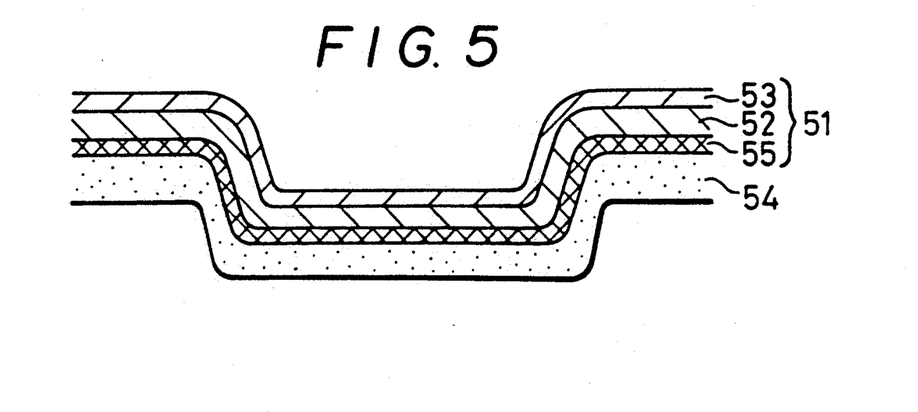
FIG. 5 is a sectional view illustrating sectional structure of an example of the laminate having a back surface layer according to the invention which is put on an expanded resin layer.

As shown in FIG. 5, the laminate 51 of the invention consisting of a substrate 52, a resin surface layer 53 and a back surface layer 55 is superposed on an expanded resin layer 54 having been prepared by expanding a resin using a fluorine-containing solvent as an expanding agent in such a manner that the back surface layer 55 of the laminate 51 is brought into contact with the surface of the expanded resin layer 54. The back surface layer 55 has prominently high resistance to fluorine-containing solvents, likewise the substrate 52, so that the resin of the back surface layer 55 and the resin of the substrate 52 are not marred by the fluorine-containing solvent of the expanded resin layer 54, and therefore the resin surface layer 53 laminated on the substrate 52 can be effectively prevented from occurrence of cracks.

As the fluorine-containing solvent (expanding agent), 1,1-dichloro-1-fluoro-2-chloro-2,2-difluoroethane ozone breakage factor: not more than 0.05) or 1,1,1-trifluoro-2-fluoroethane (flon gas R-134a, ozone breakage factor: 0) has been widely used in recent years instead of trichloromonofluoromethane (ozone breakage: 1.0) from the viewpoint of prevention of environmental pollution. However, the resin for forming the resin surface layer shows poor resistance to 1,1-dichloro-1-fluoro-2-chloro-2,2-difluoroethane gas so that when the resin surface layer is directly provided on an expanded resin material obtained by expanding a resin using this gas, cracks easily occur on the resin surface layer.

By arranging the laminate 31 of the invention on the expanded resin layer 34 in such a manner that the substrate 32 of the laminate faces the expanded resin layer as shown in FIG. 3, the resin surface layer 33 of the laminate is hardly influenced by the expanding agent released from the expanded resin layer 34. Therefore, not only the glossiness of the resin surface layer is hardly reduced, but also cracks hardly occur on the resin surface layer. Moreover, the laminate of the invention can be enhanced as a whole in the impact resistance due to the substrate 32, although the impact resistance of the resin surface layer 33 per se is not so high because the layer 33 is formed from a resin of relatively high rigidity. Especially when the resin composition containing an elastomeric copolymer is used for the substrate, the impact resistance of the laminate can be remarkably enhanced. Further, the laminate of the invention having the back surface layer 55 on the expanded resin layer 54 as shown in FIG. 5 can be much more improved in the resistance to fluorohydrocarbon gas.

The resins for forming the substrate, the back surface layer and the resin surface layer of the laminate may contain various additives such as stabilizers, fillers, dyes and pigments.

The laminate of the invention has the above-mentioned characteristics, and can be applied to various uses owing to the characteristics. For example, the laminate of the invention can be used as surface layer materials for heat insulation structures, surface layer materials for impact-resistant structures and wrapping materials for decorative products.

EFFECT OF THE INVENTION

The laminate of the invention comprises a substrate composed of a specific cycloolefin polymer (or its composition) and a resin surface layer having a specific glossiness provided on the substrate as described above, and the substrate is very excellent in the resistance to fluorohydrocarbon gases, particularly 1,1-dichloro-1-fluoro-2-chloro-2,2-difluoroethane gas.

Further, the laminate of the invention is remarkably improved in the impact resistance because the laminate has the substrate showing the above-mentioned excellent characteristics.

EXAMPLE

The laminate of the present invention is further described below referring to an example, but the invention is in no way restricted to the example.

EXAMPLE 1

[1] Preparation of substrate [A]
(1) Synthesis of cycloolefin addition polymer

In an autoclave were charged 1 liter of toluene having been dried with molecular sieves, 300 g of 1,4,5,8-dimethano-1,2,3,4,4a,5,8,8a-octahydronaphthalene and 20 mmol of dichloroethoxyoxovanadium [VO(O-Et)$_2$Cl$_2$] and was further dropped ethyl aluminum sesquichloride.

Thereafter, a mixed gas of 400 l/hour of ethylene and 1,600 l/hour of nitrogen was passed in the autoclave while controlling the temperature of the autoclave to 10° C. to perform a polymerization reaction in the autoclave.

After the reaction was complete, methanol was added to the reaction liquid to precipitate a polymer, and the precipitated polymer was collected. The obtained polymer was well washed with methanol and then dried at 60° C. under vacuum.

As a result of analysis, the produce was determined to be a copolymer of 1,4,5,8-dimethano-1,2,3,4,4a,5,8,8a-octahydronaphthalene and ethylene and having an ethylene content of 66% by mol, an intrinsic viscosity [η] of 0.6 dl/g, a melt flow rate (MFR) at 260° C. of 15 g/10 min, a glass transition point (Tg) of 122° C. and a softening temperature (TMA) of 138° C. This copolymer is referred to as a copolymer [A].

(2) Back layer [B]
(A polymer composition of modified cycloolefin/ethylene copolymer and polyethylene)

50 kg of the above-obtained copolymer of cycloolefin and ethylene was added to a solution containing 500 g of maleic anhydride and 25 g of organic peroxide (Perhexyne 25B TM, available from Nippon Yushi K., 2,5-dimethyl-2,5-bis(tert-butylperoxy)hexyne-3) in 250 g of acetone, and they were sufficiently mixed with each other.

The resulting mixture was reacted at a cylinder temperature of 270° C. under the molten state using a twin-screw extruder (PCM 45, produced by Ikegai Tekko K.K.), and then the mixture was pelletized using a pelletizer. Thus obtained modified cycloolefin addition polymer was referred to as a modified cycloolefin addition polymer [B].

A content of the maleic anhydride in the modified cycloolefin addition polymer [B] was 0.96 wt. %.

15 kg of the modified cycloolefin addition polymer [B] and crystalline polyethylene (trade name: Ultzex TM, available from Mitsui Petrochemical Industries Ltd.) were mixed with each other to prepare a back surface layer-forming resin [B].

[2] Surface layer [C] (resin surface layer)

Polyamide (NY-6)CM1046 (trade name, available from Toray Industries, Inc.) was used as a resin for forming a surface layer.

[3] Preparation of laminate

The copolymer [A], the modified cycloolefin addition polymer [B] and the resin [C] were extruded using three extruders for laminating these three kinds of polymers (produced by Placo K.K.) under the following conditions, to prepare a laminated sheet (thickness: 2 mm) of three different layers consisting of the resin surface layer [C] having a thickness of 0.2 mm, the substrate [A] having a thickness of 1.6 mm and the back surface layer [B] having a thickness of 0.2 mm.

Resin surface layer [C]
screw diameter 30 mmΦ, temperature: 260° C.
Substrate [A]
screw diameter: 45 mmΦ, temperature: 270° C.
Back surface layer [B]
screw diameter 30 mmΦ, temperature: 260° C.

Further, each of the above-mentioned resins was independently extruded using the same extruder as mentioned above to prepare three kinds of sheets, each having a thickness of 2 mm, for comparison.

Evaluation method

[Surface glossiness]

Each of the sheets was cut to give a test strip of 120 mm × 120 mm, and the test strip was measured on the surface glossiness in accordance with ASTM-D523.

[Modulus in flexure]

Each of the sheets was cut to give a test strip, and the test strip was measured on the modulus in flexure in accordance with ASTM-D790.

[Resistance to fluorohydrocarbon gas]

Figure 6:
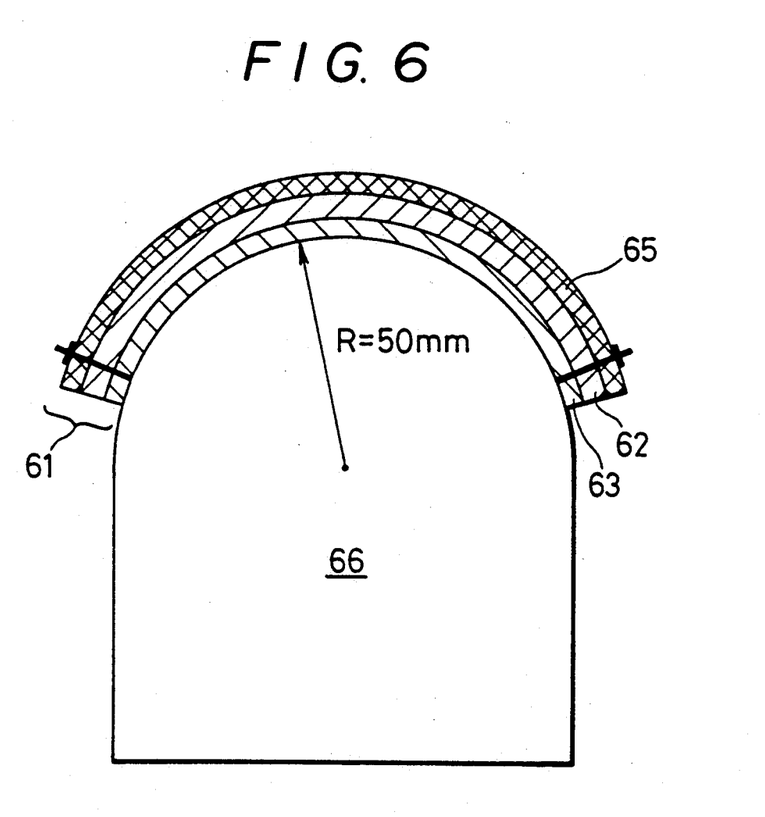
FIG. 6 is a schematic view illustrating a test method for evaluating the laminate of the invention as to its resistance to fluorohydrocarbon gas.

Each of the sheets was cut to give a test strip (size: 20 mm × 12 mm, thickness: 2 mm), and the test fitted onto a semicylindrical stainless steel seat 66 (curvature radius R: 50 mm) along the curved surface of the seat 66, as shown in FIG. 6.

In FIG. 6, the laminate 61 of the invention consisting of a substrate [A] 62, a resin surface layer [C] 63 and a back surface layer [B] 65 is arranged on the seat 66 in such a manner that the resin surface layer [C] 63 laminated on one side surface of the substrate 62 is brought into direct contact with the curved surface of the seat 66 so that the resin surface layer [C] 63 is not exposed to a fluorohydrocarbon gas but the back surface layer [B] 65 is exposed to a fluorohydrocarbon gas.

Separately, a 200 ml beaker containing 100 ml of 1,1-dichloro-1-fluoro-2-chloro-2,2-difluoroethane was placed in a desiccator (internal volume: about 20 liters) under the perforated bottom to produce a fluorohydrocarbon gas atmosphere.

The test strip fitted onto the seat placed in the desiccator on the perforated bottom, and the desiccator was closed up.

The desiccator was then placed in a constant temperature bath of 35° C. and allowed to stand for 24 hours.

With respect to the test strip placed together with the seat in the desiccator, the layer of the test strip contacting with the seat is not brought into contact with the flon gas. Namely, the surface layer [C] 63 of the laminate 61 of the invention is not in contact with the fluorohydrocarbon gas, and the back surface layer [B] 65 of the laminate 61 is in contact with the fluorohydrocarbon gas.

After the desiccator was allowed to stand for 24 hours in the constant temperature bath as described above, the test strip was taken out of the desiccator. Then, the test strip was measured on the strength, and the appearance of the test strip was observed.

The results are set forth in Table 1.

TABLE 1

|  | Glossiness | | Modulus in flexure ($10^4$ kg/cm$^2$) | |
|---|---|---|---|---|
|  | Before | After | Before | After |
| Laminate [C]/[A]/[B] | AA | AA | 2.2 | 2.2 |
| Single-layer sheet | | | | |
| [C] (NY) | AA | CC | 2.5 | 1.8 |
| [A] (cycloolefin polymer) | BB | BB | 2.5 | 2.2 |
| [B] (modified cycloolefin polymer + PE) | BB | BB | 1.8 | 1.8 |

Note: Symbols AA, BB and CC mean the followings.

AA: A reflectance of an incident light at 60° is not less than 85%.

BB: A reflectance of an incident light at 60° is more than 60% and less than 85%.

CC: A reflectance of an incident light at 60° is not more than 60%.

I claim:

1. A laminate comprising a substrate having a surface and a resin surface layer having a glossiness of not less than 60% when measured at an incidence angle of 60° which is laminated on said surface of the substrate, wherein
the substrate consists of a cycloolefin resin composition (B) containing at least one cycloolefin copolymer (A) selected from the group consisting of a random copolymer (a-1) of ethylene and a cycloolefin represented by the following formula (I), a ring opening polymer (a-2) of a cycloolefin represented by the following formula (I), a ring opening copolymer (a-3) of cycloolefins represented by the following formula (I), a hydrogenation product (a-4) of the ring opening polymer (a-2) or the ring opening copolymer (a-3), an unsaturated carboxylic acid graft-modified product (a-5) of the above (a-1), (a-2), (a-3) or (a-4), and a crosslinked produce (a-6) of the above (a-5), and a crystalline polyolefin having a crystallinity of more than 50%

(I)

wherein n is 0 or 1; m is 0 or a positive integer; q is 0 or 1; $R^1$ to $R^{18}$, $R^a$ and $R^b$ independently represent a hydrogen atom, a halogen atom or a hydrocarbon group; $R^{15}$ to $R^{18}$ may be bonded together to form a monocyclic group or a polycyclic group which may have double bond(s); and $R^{15}$ and $R^{16}$, or $R^{17}$ and $R^{18}$ may form an alkylidene group; and
the resin surface layer is formed from at least one resin selected from the group consisting of a polystyrene, an acrylonitrile/butadiene/sytrene copolymer, a polycarbonate, a polyalkylene terephthalate, a polyvinyl chloride, the cycloolefin polymer (A), a polyamide, and a cycloolefin resin composition (C) containing the cycloolefin polymer (A) and an α-olefin elastomeric copolymer having a crystallinity of not more than 25%.

2. The laminate as claimed in claim 1, wherein the cycloolefin resin composition (B) of the substrate further contains an α-olefin elastomeric copolymer having a crystallinity of not more than 25%.

3. The laminate as claimed in claim 1, wherein the crystalline polyolefin has a crystallinity of 55 to 85%.

4. A laminate comprising a substrate having a first surface and a second surface on opposite sides thereof, a resin surface layer having a glossiness of not less than 60% when measured at an incidence angle of 60° provided on said first surface of the substrate and a back surface layer provided on said second surface of the substrate, wherein the substrate consists of at least one cycloolefin copolymer (A) selected from the group consisting of a random copolymer (a-1) of ethylene and a cycloolefin represented by the following formula (I), a ring opening polymer (a-2) of a cycloolefin represented by the following formula (I), a ring opening copolymer (a-3) of cycloolefins represented by the following formula (I), a hydrogenation product (a-4) of the ring opening polymer (a-2) or the ring opening copolymer (a-3), an unsaturated carboxylic acid graft-modified product (a-5) of the above (a-1), (a-2), (a-3) or (a-4), and a crosslinked product (a-6) of the above (a-5), (I)

-continued wherein n is 0 or 1; m is 0 or a positive integer; q is 0 or 1; $R^1$ to $R^{18}$, $R^a$ and $R^b$ independently represent a hydrogen atom, a halogen atom or a hydrogen group; $R^{15}$ or $R^{18}$ may be bonded together to form a monocyclic group or a polycyclic group which may have double bond(s); and $R^{15}$ and $R^{16}$, or $R^{17}$ and $R^{18}$ may form an alkylidene group, or the substrate consists of a cycloolefin resin composition (C) containing the cycloolefin polymer (A) and an α-olefin elastomeric copolymer having a crystallinity of not more than 25%;

the resin surface layer is formed from at least one resin selected from a polystyrene, an acrylonitrile/-butadiene/-styrene copolymer, a polycarbonate, a polyalkylene terephthalate, a polyvinyl chloride, the cycloolefin polymer (A), a polyamide, and a cycloolefin resin composition (C) containing the cycloolefin polymer (A) and an α-olefin elastomeric copolymer having a crystallinity of not more than 25%, said resin for forming the resin surface layer being different from the resin for forming the substrate; and the back surface layer is formed from a cycloolefin resin composition (B) containing the cycloolefin copolymer (A) and a crystalline polyolefin having a crystallinity of more than 50%.

5. The laminate as claimed in claim 4, wherein the substrate consists of the cycloolefin copolymer (A).

6. The laminate as claimed in claim 4, wherein the cycloolefin resin composition (C) of the substrate further contains a crystalline polyolefin having a crystallinity of more than 50%.

7. The laminate as claimed in claim 6, wherein the crystalline polyolefin has a crystallinity of 55 to 85%.

8. The laminate as claimed in claim 4, wherein the cycloolefin resin composition (B) of the back surface layer further contains an α-olefin elastomeric copolymer having a crystallinity of not more than 25%.

9. The laminate as claimed in claim 4, wherein the crystalline polyolefin has a crystallinity of 55 to 85%..

* * * * *